April 17, 1962 F. W. HACKER 3,029,791
BUNK FEEDER CONTROL MECHANISM
Filed March 7, 1960 2 Sheets-Sheet 1

*INVENTOR.*
FREDERICK W. HACKER
BY
*Andrus & Starke*
Attorneys

April 17, 1962  F. W. HACKER  3,029,791
BUNK FEEDER CONTROL MECHANISM
Filed March 7, 1960  2 Sheets-Sheet 2

INVENTOR.
FREDERICK W. HACKER
BY
Attorneys

United States Patent Office 3,029,791
Patented Apr. 17, 1962

3,029,791
BUNK FEEDER CONTROL MECHANISM
Frederick W. Hacker, Kankakee, Ill., assignor, by mesne assignments, to A. O. Smith Harvestore Products, Inc., Kankakee, Ill., a corporation of Delaware
Filed Mar. 7, 1960, Ser. No. 13,054
3 Claims. (Cl. 119—52)

This invention relates to a bunk feeder control mechanism, and more particularly to a mechanism for raising and lowering an auger-type bunk feeder to control the distribution of the feed.

In the mechanized methods of feeding livestock from a feed supply stored in a large silo or the like, it is desirable to have a direct feed conveying system connecting the silo unloader and the feed trough to avoid extra feed handling. Depending on the type of feed, and the type and size of livestock to be fed, it is desirable to vary the pattern and depth of feed in the feed trough. Feed distribution may be accomplished by raising and lowering the feed conveying member, such as an auger, in relation to the feed trough. This control makes it possible to establish a ratio between two different types of feed which are successively fed through the feed conveying system. In the past, the raising or lowering of the auger has been accomplished manually, and at individual points along the length of the feed trough. This manual control method is time consuming because adjustment at each support point along the feed trough must be done in steps, due to the auger rigidity.

The present invention solves the control problem and provides an automatic mechanism for raising and lowering the auger in a bunk feeder for livestock. The mechanism allows synchronous raising and lowering at all points along the feed trough to provide rapid control of the feed pattern and volume. Also, by use of a deflector plate below the auger, the feed may be deflected to one side of the feed trough for segregated, fence line feeding of a separate pen of livestock. Since this apparatus has a motorized unit, it can be provided with a remote control station located inside a sheltered area, such as a house or a barn.

In general, the present invention includes a livestock feeder assembly connected to a silo and a raising and lowering mechanism for adjusting the height of the feeder, and a feed trough. Adjustment of height in relation to the feed trough provides close control of the volume of feed discharged. A deflector plate may be included as part of the feeder assembly to deflect feed to one side of the feed trough for fence line feeding.

The accompanying drawings illustrate the best mode presently contemplated for carrying out the invention.

Figure 1:
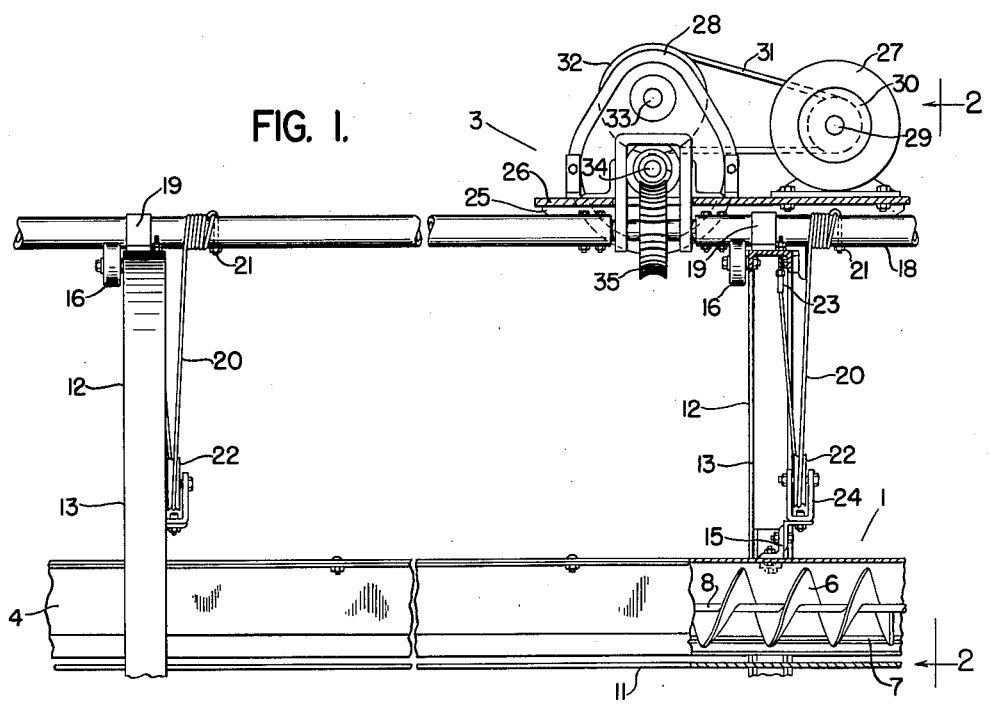
FIGURE 1 is a side elevation with parts broken away in section showing the control mechanism as applied to an auger conveyor.

As shown in the drawings, the livestock feeder includes, generally, a conveyor assembly 1 which is disposed above, and in parallel relation to, a feed trough 2. The conveyor assembly 1 is suspended from an elevating mechanism 3 which raises and lowers the conveyor assembly 1 in relation to the feed trough 2, thereby providing an automatic means for regulating the quantity of feed by controlling the feed stack volume in the feed trough 2. The conveyor assembly 1 includes a U-shaped housing 4 having a discharge slot 5 in the bottom thereof. An auger 6 is supported on wear strips 7 which are longitudinally disposed on the inner surface of the housing adjacent slot 5. Auger 6 is mounted on a drive shaft 8 which is connected to a drive unit, not shown.

Depending brackets 9 on housing 4 rotatably support shafts 10 which are connected to each end of a deflector plate 11 disposed below the slot 5 of the housing 4. Feed falling from slot 5 contacts the deflector plate 11 and is deflected to one or both sides of the trough according to the angle of plate 11.

The elevating mechanism 3 includes a plurality of inverted U-shaped arches 12 which are secured in spaced relation to the trough 2. The arches 12 have a channel shaped cross section and the web portions of the vertical leg 13 of the arches are secured flatwise to the respective inner surfaces of the side walls 14 of the trough and the open ends of the channels face inwardly toward the center of the trough.

To guide the auger housing 4 in vertical movement, a plurality of cross bars 15 are secured in spaced relation to the upper end of the housing 4 and extend laterally beyond the housing. The ends of cross bars 15 are slidably received within the respective channel-shaped legs 13, of arches 12, and provide centering means for the conveyor assembly 1.

A pair of rollers 16 are rotatably mounted at the center of the bridge portion 17 of each of the arches 12. A winding shaft 18 is rotatably supported on the pair of rollers 16 and extends substantially the length of the auger housing 4. Lateral displacement of shaft 18 is prevented by angle brackets 19 which are mounted on each arch 12 and are located on opposite sides of the shaft.

The conveyor assembly 1 is raised and lowered by a plurality of cables 20 which are secured in spaced relation to shaft 18 by clamp bolts 21. The other end of each cable 20 extends downwardly around a sheave 22 and is secured to an anchor bolt 23 which is connected to the bridge portion 17 of arch 12. Sheave 22 is rotatably mounted on a bifurcated bracket 24, which is fastened to the cross bar 15 on auger housing 4.

Figure 2:
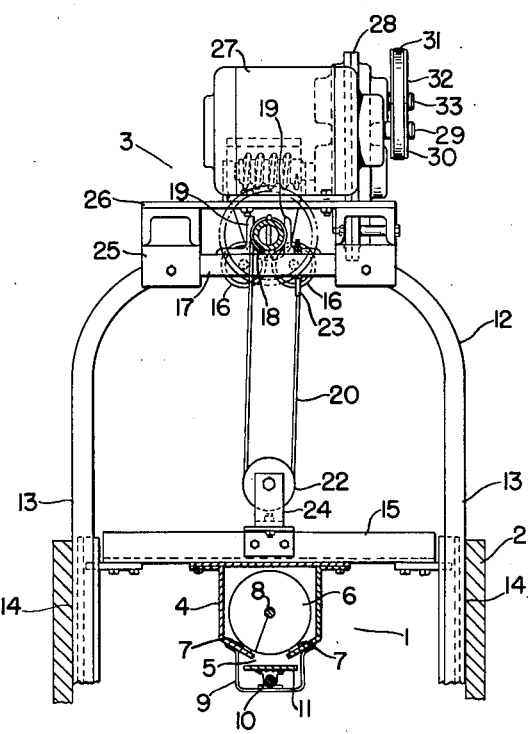
FIG. 2 is a transverse section taken along line 2—2 of FIGURE 1.
Figure 3:
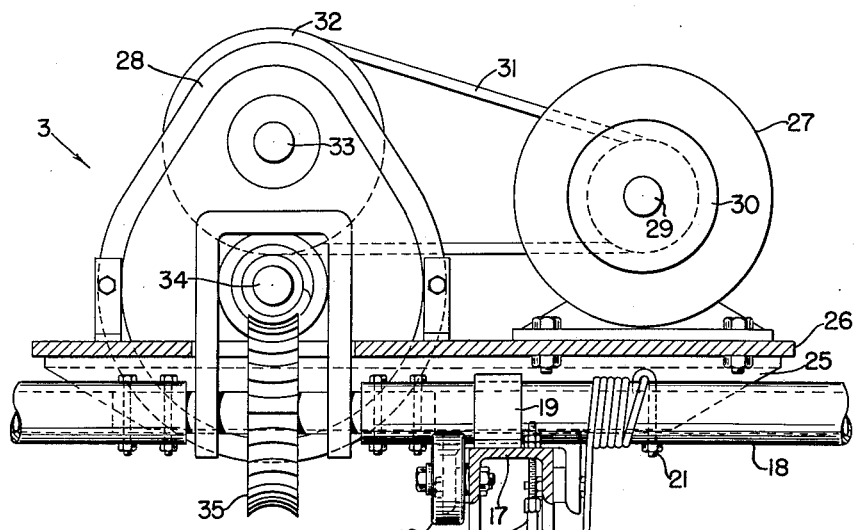
FIG. 3 is an enlarged fragmentary side elevation of the control mechanism with parts broken away in section.
Figure 3:
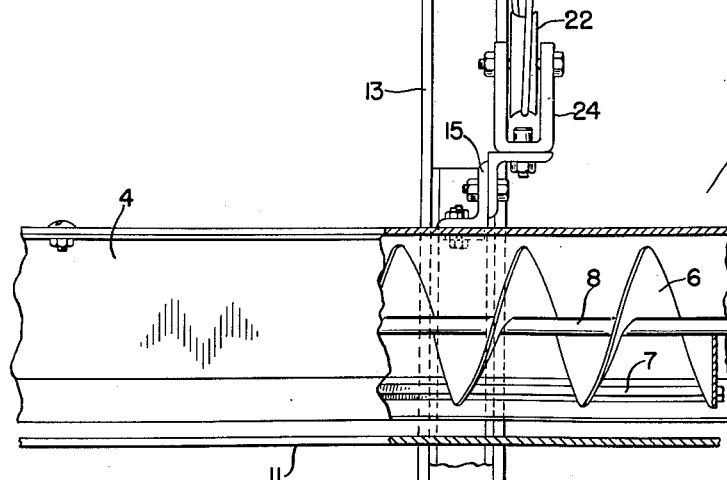

By rotating winding shaft 18 clockwise, as shown in FIG. 2, the cable 20 is wound on the shaft and the conveyor assembly 1 is thereby elevated, while rotating the shaft 18 counter-clockwise will unwind the cable and lower the conveyor assembly.

The drive unit for rotating the winding shaft 18 is mounted on one of the arches 12. Support brackets 25 are secured to the arch 12 and a drive unit base plate 26 is fastened on top of the support brackets 25. An electric motor 27 and a speed reduction unit 28 are mounted on base plate 26. The motor 27 has drive shaft 29 keyed to a sheave 30 and a V-belt 31 connects the sheave 30 to a relatively larger sheave 32 mounted on an input shaft 33 on the speed reduction unit 28. The speed reduction unit 28 also has a worm output shaft 34, which meshes with a worm gear 35 mounted on the winding shaft 18.

In operation, the electric motor 27 is energized to drive the output shaft 34 of the speed reduction unit 28 through belt 31. Rotation of output shaft 34 drives worm gear 35 to rotate winding shaft 18. Rotation of shaft 18 in a clockwise direction as viewed in FIG. 2 winds the cable 20 onto the shaft 18, raising the auger assembly. The same cable-winding motion is imparted at all points along the shaft 18, providing a constant attitude of ascent of the auger assembly by means of uniform winding of a plurality of cables 20 spaced along the shaft 18 at each supporting arch 12. As the auger assembly is raised to higher positions over the feed bin, a higher and wider feed supply is deposited in the feed bin by the conveyor assembly 1. This larger volume of feed is often desired when the livestock are being fattened for market. It is also relatively easy to control the volume ratio between different kinds of feed, such as silage and corn, by regulating the height of the conveyor assembly over the feed bin, during the unloading of the respective feed components.

The motor 27 is equipped with a reversing switch, not shown, to thereby effect rotation of shaft 18 in the opposite direction and lower the conveyor assembly by unwinding the cables 20 from the shaft 18. It is also possible to provide a manual clutch at worm gear 35. Release of the manual clutch would allow the auger assembly to be lowered by gravity. Motor regulated lowering is preferred, however, since it may be controlled more accurately, and can be accomplished from a remote control point such as inside a barn or house.

The mechanical interconnection of the raising and lowering means at the auger assembly support points allows for synchronous raising and lowering of the complete conveyor assembly in a single coordinated motion. Such overall control was not possible with prior livestock bunk feeders.

The invention provides a novel raising and lowering mechanism used in conjunction with an auger-type livestock bunk feeder for accurately controlling feed quantities and feed ratios by uniform height control of the auger assembly over the feed bin.

Various modes of carrying out the invention are contemplated as being within the scope of the following claims particularly pointing out and distinctly claiming the subject matter which is regarded as the invention.

I claim:

1. A livestock feeder, comprising a trough to receive feed, a plurality of support members disposed in spaced relation along the length of the trough, a rotatable member rotatably mounted on said support members and disposed longitudinally above said trough, a plurality of cables secured to said rotatable member in spaced relation along the length thereof, a feed conveying member disposed above the bottom of the trough and supported by the cables and adapted to convey and distribute feed to said trough, slidable guide means positioned on and stabilizing said feed conveying member over the longitudinal midline of said trough and drive means including a motor and a speed reduction gear unit mounted on the top of one or more of said support members and operably connected to said rotatable member for rotating said rotatable member to wind and unwind the cables and thereby raise and lower the conveying member.

2. A livestock feeder, comprising a feed trough, a feed conveying member, a plurality of sheaves rotatably mounted on said feed conveying member, a plurality of supporting arches disposed at spaced intervals along the length of the feed trough with each arch having a pair of vertical legs and a central bridge portion disposed above said feed trough, guide means rigidly secured to the feed conveying member, said guide means having end portions keyed to the opposite vertical legs of at least two of said supporting arches for stabilizing the feed conveying member during raising and lowering and while livestock are feeding from the feed trough disposed thereunder, a rotatable shaft disposed above and generally parallel to said feed trough and said feed conveying member and being rotatably supported on the bridge portions of said arches, bearing means disposed on each of said arches and being adapted to rotatably receive and support said rotatable shaft, and a plurality of cables, each having a first end connected to said rotatable shaft and extending downwardly around a rotatable sheave on the auger feeder assembly and upwardly therefrom, and each cable having a second end secured to the bridge portion of said arch, said cable being adapted to raise and lower said auger feeder assembly by winding and unwinding said cable around said rotatable shaft.

3. A livestock feeder, comprising a trough-shaped feed receptacle, a plurality of inverted U-shaped supporting members, each comprising a central bridge portion and a pair of legs, said supporting members being disposed with the bridge portions above said feed receptacle, an auger feeder assembly disposed above said feed receptacle, a plurality of cross bars mounted on said auger feeder assembly, means associated with the legs of said supporting members receiving the ends of said cross bars and guiding and stabilizing the feeder assembly in movement relative to said feed receptacle, a plurality of rotatable sheave members mounted on the feeder assembly, bearing means mounted on the bridge portions of said supporting members, a rotatable shaft disposed above and generally parallel to said feed receptacle and said feeder assembly and journaled on said bearing means, a plurality of cables each having one end attached to the bridge portion of a supporting member and extending downwardly around one of said rotatable sheave members on the feed assembly and upwardly to said rotatable shaft, said cables providing raising and lowering means and suspension means for said feeder assembly, said shaft providing anchoring and winding means for said cables, and drive means for rotating said shaft to wind said cables thereon, thereby synchronously raising said feeder assembly in relation to the feed receptacle to change the distribution of feed in said trough.

References Cited in the file of this patent

UNITED STATES PATENTS

| | | |
|---|---|---|
| 2,278,298 | Young | Mar. 31, 1942 |
| 2,827,156 | Linder | Mar. 18, 1958 |
| 2,848,977 | Prestrud et al. | Aug. 26, 1958 |
| 2,851,993 | Hettinger | Sept. 16, 1958 |
| 2,867,314 | Hansen | Jan. 6, 1959 |
| 2,879,743 | Hostetler | Mar. 31, 1959 |
| 2,926,629 | Hazen | Mar. 1, 1960 |